(12) United States Patent
Bartek et al.

(10) Patent No.: US 8,236,173 B2
(45) Date of Patent: Aug. 7, 2012

(54) BIOMASS PRETREATMENT FOR FAST PYROLYSIS TO LIQUIDS

(75) Inventors: Robert Bartek, Centennial, CO (US); Michael Brady, Studio City, CA (US); Dennis Stamires, Dana Point, CA (US)

(73) Assignee: KiOR, Inc., Pasadena, TX (US)

( * ) Notice: Subject to any disclaimer, the term of this patent is extended or adjusted under 35 U.S.C. 154(b) by 0 days.

(21) Appl. No.: 13/045,444

(22) Filed: Mar. 10, 2011

(65) Prior Publication Data

US 2012/0047794 A1 Mar. 1, 2012

(51) Int. Cl.
 *C10C 3/02* (2006.01)
(52) U.S. Cl. ........ 208/400; 208/404; 208/405; 585/469; 585/638; 585/733
(58) Field of Classification Search .................. 208/400, 208/404–405; 585/469, 638, 733
See application file for complete search history.

(56) References Cited

U.S. PATENT DOCUMENTS

| | | | | |
|---|---|---|---|---|
| 3,650,704 A | * | 3/1972 | Kumura et al. | 423/415.1 |
| 3,864,096 A | * | 2/1975 | Urban | 585/242 |
| 4,237,101 A | * | 12/1980 | Willard, Sr. | 44/490 |
| 4,797,135 A | | 1/1989 | Kubat et al. | |
| 5,792,340 A | * | 8/1998 | Freel et al. | 208/127 |
| 5,865,898 A | | 2/1999 | Holtzapple et al. | |
| 2007/0000177 A1 | | 1/2007 | Hippo et al. | |
| 2008/0029233 A1 | | 2/2008 | Wingerson et al. | |
| 2008/0229657 A1 | | 9/2008 | Senyk et al. | |
| 2009/0090046 A1 | | 4/2009 | O'Connor et al. | |
| 2009/0227823 A1 | | 9/2009 | Huber et al. | |
| 2010/0113849 A1 | | 5/2010 | Bartek et al. | |
| 2010/0187162 A1 | | 7/2010 | O'Connor et al. | |
| 2010/0204378 A1 | | 8/2010 | O'Connor | |
| 2010/0205858 A1 | | 8/2010 | O'Connor | |
| 2011/0094147 A1 | | 4/2011 | Bartek et al. | |
| 2011/0099888 A1 | | 5/2011 | Bartek et al. | |
| 2011/0114876 A1 | | 5/2011 | Brady et al. | |

FOREIGN PATENT DOCUMENTS

| | | | |
|---|---|---|---|
| EP | 1852466 | * | 7/2007 |
| EP | 2105486 | | 9/2009 |
| WO | WO 2007/128800 | | 11/2007 |
| WO | WO 2010/063029 | | 6/2010 |
| WO | WO 2010/068773 | | 6/2010 |
| WO | WO 2010/071677 | | 6/2010 |
| WO | WO 2010/075405 | | 7/2010 |
| WO | WO 2010/111396 | | 9/2010 |
| WO | WO 2010/135734 | | 11/2010 |

OTHER PUBLICATIONS

Bridgewater, A., "Principles and practice of biomass fast pyrolysis processes for liquids," Journal of Analytical and Applied Physics, 51:3-22, (Jul. 1999).
Bridgewater, A., "Fast pyrolysis processes for biomass," Renewable and Sustainable Energy Reviews, 4:1-73, (2000).
Huber, G., et al., "Synthesis of transportation fuels from biomass: chemistry, catalysts and engineering," Chem. Rev., 106(9):(55 pages), (Sep. 2006).
Lappas, A., et al., "Biomass pyrolysis in a circulating fluid bed reactor for the production of fuels and chemicals," Fuel IPC Science and Technology Press, 81(16):2087-2095, (Nov. 1, 2002).
Lapas et al., "Design, Construction, and Operation of a Transported Fluid Bed Process Development Unit for Biomass Fast Pyrolysis: Effect of Pyrolysis Temperature," Ind. Eng. Chem. Res., 47(3):742-747, (Feb. 6, 2008).
Mckendry, P., "Energy production from biomass (part 1): overview of biomass," Bioresource Technology, 83(1):37-46, (May 2002).
Nevell, et al., "Thermal degradation of cellulose," Cellulose Chemistry and Its Application, Ellis Horwood Ltd., p. 266, (1985).
Wyman, et al., "Coordinated development of leading biomass pretreatment technologies," Bioresource Technology, 96(18):1959-1966, (Dec. 2005).

* cited by examiner

*Primary Examiner* — Walter D Griffin
*Assistant Examiner* — Brian McCaig
(74) *Attorney, Agent, or Firm* — Jennifer A. Camacho; Natalie Salem

(57) ABSTRACT

Aspects of the present invention relate to methods, systems, and compositions for preparing a solid biomass for fast pyrolysis. The method includes contacting the solid biomass with an inorganic material present in an effective amount for increasing fast pyrolysis yield of an organic liquid product (e.g., bio-oil). In various embodiments, the inorganic material is selected from the group consisting of aluminum sulfate, aluminum nitrate, aluminum chloride, aluminum hydroxide, ammonium hydroxide, magnesium hydroxide, potassium hydroxide, and combinations thereof.

18 Claims, No Drawings

BIOMASS PRETREATMENT FOR FAST PYROLYSIS TO LIQUIDS

FIELD OF THE INVENTION

The invention relates generally to a process for pretreating biomass material prior to conversion to liquid product. More particularly the invention relates to a pretreatment process comprising contacting the biomass material with an inorganic material that can increase the yield of liquid product from the pretreated biomass material relative to untreated biomass.

BACKGROUND OF THE INVENTION

World energy demand is projected to increase substantially due to an increase in the world's population; improvement of the standard of living in underdeveloped countries; and depletion of the reserves of fossil fuels.

Now, generally recognized by major countries, global climatic changes caused by increasing emissions of greenhouse gases, such as $CO_2$, require that newly developed energy sources must be environmentally compatible and sustainable. Therefore, greener sources of energy are needed to replace or reduce the consumption of fossil fuels. Biomass is a sustainable and renewable source of fuel, with potentially a net zero greenhouse gas impact. Biomass, in particular biomass of plant origin, is recognized as an abundant potential source of fuels and specialty chemicals. See, for example, "Energy production from biomass," by P. McKendry—Bioresource Technology 83 (2002) pp. 37-46 and "Coordinated development of leading biomass pretreatment technologies" by Wyman et al., Bioresource Technology 96 (2005) pp. 1959-1966. Refined biomass feedstock, such as vegetable oils, starches, and sugars, can be substantially converted to liquid fuels including biodiesel (e.g., methyl or ethyl esters of fatty acids) and ethanol. However, using refined biomass feedstock for fuels and specialty chemicals can divert food sources from animal and human consumption, raising financial and ethical issues.

Inedible biomass can also be used to produce liquid fuels and specialty chemicals. Examples of inedible biomass include agricultural waste (such as bagasse, straw, corn stover, corn husks, and the like) and specifically grown energy crops (like switch grass and saw grass). Other examples include trees, forestry waste, such as wood chips and saw dust from logging operations, or waste from paper and/or paper mills. In addition, aquacultural sources of biomass, such as algae, are also potential feedstocks for producing fuels and chemicals. Inedible biomass generally includes three main components: lignin, amorphous hemi-cellulose, and crystalline cellulose. Certain components (e.g., lignin) can reduce the chemical and physical accessibility of the biomass, which can reduce the susceptibility to chemical and/or enzymatic conversion.

Attempts to produce fuels and specialty chemicals from biomass can suffer low yields of desired products and low value products (e.g., unsaturated, oxygen containing, and/or annular hydrocarbons). Although such low value products can be upgraded into higher value products (e.g., conventional gasoline, jet fuel), upgrading can require specialized and/or costly conversion processes and/or refineries, which are distinct from and incompatible with conventional petroleum-based conversion processes and refineries. Thus, the wide-spread use and implementation of biomass to produce fuels and specialty chemicals at high yields face many challenges.

For example, biomass derived from forestry, agriculture and cellulosic waste materials, due to its compact strong physical construction and its chemical nature containing primarily cellulose, hemicellulose, lignin, mineral matter and other materials, resists conversion processes such as thermal, hydrothermal, and enzymatic processes, which are used to convert said biomass to fuels and chemicals. In particular, the most abundant and useful components for the conversion, the cellulose and hemicellulose, are bundled up and sealed by the protective coating provided by the lignin component. Therefore, a direct exposure of the cellulose and hemicellulose to chemical reagents or even to thermal conditions is prevented by the lignin and other foreign, non-cellulosic substances present. Additionally, any primary product resulting from the contact of the biomass with a chemical reagent or during thermo-decomposition, and derived from one or more of the components in the biomass substance, is diffusionally restricted from escaping the reaction zone due to the lack of bulk accessibility in the biomass particle.

The reaction products and intermediates being restricted in the bulk of the biomass, and remaining in contact within themselves for longer periods, can further interact within themselves, or can interact with unreacted segments of the biomass or with other components present, to form secondary products. These secondary products are not only undesirable, but their presence in the biomass substrate can alter the reaction pathway, thereby causing changes in the yields and kinds of products obtained from the commercial process.

Further, the three major biomass components (cellulose, hemicelluloses and lignin) have different reactivities towards acids and bases, as well as having different thermal stabilities, and decompose at different rates to different products like organic volatiles, chars, water and gases, including $CO/CO_2$. Unfortunately, the production of chars and gases are produced at the expense of the yield of organic volatiles, thus making the known commercial conversion processes inefficient and costly. In particular, in Cellulose Chemistry and Its Application, T. P. Nevell and S. H. Zeronian (Eds), Chapter 11, "Thermal degradation of cellulose", Ellis Horwood Ltd (1985) p. 266, it was shown that the presence of inorganic compounds, whether indigenous or added, selectively promotes the formation of char at the expense of tarry oils.

Therefore, there is a need for an improved pretreatment process that will modify the biomass-feed in such a way that when subjected to thermo-conversion (e.g., pyrolysis) processes, it will yield more volatile condensable oily products (e.g., organic liquids) and less char, $CO/CO_2$, other gases and water. Furthermore, there is a significant incentive to increase the yield of organic liquid products obtained by pyrolysis and other thermo-conversion processes.

SUMMARY OF THE INVENTION

The present invention provides methods, systems and compositions for maximizing the amount of condensable biocrude vapors released from pyrolysis of solid biomass, which represents a clear economic and process advantage over existing methods and systems. In particular, the present invention provides methods for pretreating a biomass material that allow biomass conversion via pyrolysis to result in higher yields of organic liquids (e.g., bio-oil), as well as bio-oil of improved quality.

In one aspect, the invention features a method for pretreating a solid biomass for fast pyrolysis. The method includes contacting the solid biomass with an inorganic material present in an effective amount for increasing fast pyrolysis yield of an organic liquid product (e.g., bio-oil), thereby forming a pre-treated biomass. In various embodiments, the inorganic material is selected from the group consisting of aluminum sulfate, aluminum nitrate, aluminum chloride, aluminum hydroxide, ammonium hydroxide, magnesium hydroxide, potassium hydroxide, calcium hydroxide, sodium hydroxide, and any combination of any foregoing materials.

In another aspect, the invention features a method for producing an organic liquid product (e.g., bio-oil) from a solid biomass. The method includes (i) contacting the solid biomass with an inorganic material present in an effective amount for increasing fast pyrolysis yield of an organic liquid product; and (ii) subjecting the solid biomass to a fast pyrolysis reaction in the presence of the inorganic material to produce the organic liquid product. In various embodiments, the inorganic material is selected from the group consisting of aluminum sulfate, aluminum nitrate, aluminum chloride, aluminum hydroxide, ammonium hydroxide, magnesium hydroxide, potassium hydroxide and any combination of any of the foregoing materials.

In still another aspect, the invention features a composition for fast pyrolysis. The composition can include a solid biomass and an inorganic material, wherein the inorganic material is present in an effective amount for increasing fast pyrolysis yield of an organic liquid product. At least a portion of the inorganic material is accessible to at least a portion of the solid biomass. The inorganic material can be selected from the group consisting of aluminum sulfate, aluminum nitrate, aluminum chloride, aluminum hydroxide, ammonium hydroxide, magnesium hydroxide, potassium hydroxide and any combination of any of the foregoing materials.

In another aspect, the invention features a method for pretreating a solid biomass for pyrolysis. The method includes contacting the solid biomass with an inorganic material present in an effective amount for increasing pyrolysis yield of an organic liquid product (e.g., bio-oil), thereby forming a pre-treated biomass.

In yet another aspect, the invention features a method for producing an organic liquid product (e.g., bio-oil) from a solid biomass. The method includes (i) contacting the solid biomass with an inorganic material present in an effective amount for increasing pyrolysis yield of an organic liquid product; and (ii) subjecting the solid biomass to a pyrolysis reaction in the presence of the inorganic material to produce the organic liquid product. In various embodiments, the inorganic material is selected from the group consisting of aluminum sulfate, ammonium hydroxide, magnesium hydroxide, and any combination of any of the foregoing materials.

In still another aspect, the invention features a composition for pyrolysis. The composition can include a solid biomass and an inorganic material. In various embodiments, the inorganic material is present in an effective amount for increasing pyrolysis yield of an organic liquid product. At least a portion of the inorganic material is accessible to at least a portion of the solid biomass. The inorganic material can be selected from the group consisting of aluminum sulfate, ammonium hydroxide, magnesium hydroxide, and any combination of any of the foregoing materials.

In other examples, any of the aspects above, or any method, apparatus, or composition of matter described herein, can include one or more of the features described below. Furthermore, in certain embodiments, method steps can be preformed in the order presented or in any other combinations or number of iterations.

In various embodiments, the inorganic material is selected from the group consisting of aluminum sulfate, ammonium hydroxide, magnesium hydroxide, and any combination of any of the foregoing materials. In certain embodiments, the inorganic material is aluminum sulfate. In some examples, the inorganic material is present between about 0.1 wt % to about 4 wt %, between about 0.1 wt % to about 3 wt %, between about 0.1 wt % to about 2 wt %, or at about 1 wt %.

In various embodiments, methods of the present invention can further include contacting the pretreated biomass with a heat carrier. In certain embodiments, the methods can further include contacting the solid biomass with a heat carrier. For example, subjecting the solid biomass to the pyrolysis reaction in step (ii) above can further include contacting the solid biomass with a heat carrier. The heat carrier can be an inert material, a catalytic material, a regenerated catalytic material, or a combination of any two or more thereof. In some embodiments, the inert material can include silica sand, a refractory transition metal oxide, a refractory clay, a calcined mixed metal oxide, or a combination of any two or more thereof.

In certain embodiments, the fast pyrolysis reaction can be conducted at between about 400° C. and about 600° C. For example, fast pyrolysis can be conducted at between about 450° C. and about 500° C., inclusive.

In various embodiments, the method can further include pretreating the solid biomass for fast pyrolysis. Pretreating can include one or more of blending, milling, grinding, kneading, swelling, demineralization, heat treatment, and steam explosion. For example, pretreating can include causing the inorganic material to impregnate the solid biomass, such that at least a portion of the solid biomass can be made accessible to at least a portion of the inorganic material. In addition, the inorganic material and the solid biomass can be co-milled or otherwise mixed together.

Other aspects and advantages of the invention will become apparent from the following drawings and description, all of which illustrate principles of the invention, by way of example only.

DETAILED DESCRIPTION OF THE INVENTION

The present invention relates to methods, systems, and compositions for increasing bio-oil yields of biomass thermoconversion processes. In various embodiments, bio-oil yields can be modified by impregnating the biomass with certain inorganic materials. For example, low levels (about 4 wt %, about 2 wt %, about 1 wt %, or less) of acids, bases, and/or salts can enhance bio-oil yields during pyrolysis. In particular, the present invention relates to an unexpected finding that pretreating the biomass with these materials according to the methods and compositions described herein can have a significant impact upon bio-oil yields. For example, as described in the Example section below, impregnation of the biomass with aluminum sulfate gave a significant increase in bio-oil yield. Ammonium hydroxide impregnation also increased bio-oil yield.

Accordingly, the present invention provides methods and compositions for increasing the yield of organic liquids in a biomass pyrolysis reaction. Such methods and compositions include inorganic materials, such as aluminum sulfate, aluminum nitrate, aluminum chloride, aluminum hydroxide, ammonium hydroxide, magnesium hydroxide, potassium hydroxide, calcium hydroxide, and/or sodium hydroxide for pretreatment of the biomass materials.

The following is a description of certain embodiments of the invention, given by way of example only.

Solid Biomass and Biomass Particles

In various embodiments, biomass includes materials of photosynthetic (e.g., plant) origin having cellulose, hemicellulose, and/or lignin. Biomass includes materials produced by photosynthetic conversion of carbon dioxide and water using solar energy. In general, biomass including cellulose, hemicellulose, and/or lignin originates from land plants. Some aquatic plants include little or no lignin. The cellulose component is a polymer of glucose, formed in long strands. It is associated with the hemicellulose component layer, and both the crystalline cellulose and hemicellulose are encapsulated by the lignin cell wall.

The invention is applicable to any biomass including any amount of cellulose, hemicellulose, and/or lignin. Biomass sources include, but are not limited to, cereal grains (e.g., including corn), grasses, sugar cane, trees, and the like. Biomass sources also include by-products of agricultural or forestry activities, such as straw, chopped straw, cotton linters, corn husks, corn stalks, corn cobs, wood chips, saw dust, bagasse, sugar beet pulp, tree bark, grasses, and the like. Biomass sources also include aquatic sources such as algae and seaweed.

Biomass sources can be used without requiring chemical pre-processing (e.g., chemically altering the biomass). In various embodiments, biomass sources include (chemically) unrefined material of photosynthetic origin. Biomass sources can be subjected to physical pre-processing such as a drying and/or a particle size reduction step. Such a drying and/or a particle size reduction step does not significantly change the relative composition of the biomass in terms of cellulose, hemicellulose and/or lignin and therefore such a step is not necessarily considered refining.

In various embodiments, biomass can be processed into a feedstock for thermo-conversion having particles that are solid and in a finely divided form (e.g., saw dust and ground straw). Biomass feedstock can include solid materials as well as materials that might be classified as liquids, but that have a very high viscosity (e.g., small or large colony algae). Biomass particles can be prepared from biomass sources and larger particles by techniques such as milling, grinding, shredding, chipping, kneading, pulverization, and the like. Conventional paper processing/pulping methods and equipment can be used to prepare biomass particles. For example, biomass from sources such as straw and wood can be converted to particles in a size range of about 5 mm to about 5 cm using techniques such as milling or grinding.

In various embodiments, a disintegrator can be used to process plant matter at a location in close proximity to an agricultural site used to produce such plant matter, to produce the solid biomass particles. In operation, a disintegrator can be used to modify the consistency of, e.g., biomass feedstock, and/or to reduce its average particle size. The disintegrator can include at least one of a mill, fragmenter, fractionator, granulator, pulverizer, chipper, chopper, grinder, shredder, mincer, and a crusher.

In various embodiments, solid biomass particles can be agitated to reduce the size of the particles. In some embodiments, agitating is facilitated by fluid conveyance, including, without limitation, by gas flow or pneumatic conveyance. Agitating can be conducted in a vertical vessel, such as a riser or downer. An agitator can include a conveyor, a riser (up flow), or downer (down flow). Agitating can result in a dispersion of particle sizes. For example, proper agitation the solid biomass particles as described above can result in individual particles sizes ranging from microns, to tens of microns, to tenths of centimeters, to centimeters or greater. The biomass can be subjected to a particle size reduction step, or can be collected in the form of particles (e.g., algae cells, colonies, flocculated algae, and the like).

In various embodiments, the biomass particles are reduced to, or have, an average particle size of less than about 1000 microns. Alternatively, the biomass particles are reduced to, or have, an average particle size of greater than about 1000 microns. The plurality of solid biomass particles can be substantially characterized by individual sizes below about 2000, 1900, 1800, 1700, 1600, 1500, 1400, 1300, 1200, 1100, 1000, 900, 800, 700, 600, 500, 400, 300, 200, or 100 microns. In various embodiments, at least a fraction of the biomass particles have a size of about 1-2000, 1-1500, 1-1000, or 1000-2000 microns. For example, the biomass particles can have an average size of less than about 2000, 1750, 1500, 1250, 1000, 750, 500, or 250 microns. In some embodiments, at least a fraction of the biomass particles are reduced to a size below about 500, 475, 450, 425, 400, 375, 350, 325, 300, 275, 250, 225, 200, 175, 150, 125, 100, 90, 80, 70, 60, 50, 40, 30, 20, 15, 10, or 5 microns. Individual particles sizes can range from microns, to tens of microns, to tenths of centimeters, to centimeters or greater.

Solid biomass particles do not necessarily assume a spherical or spheroid shape. For example, solid biomass particles can be needle shaped and/or assume another cylinder-like or elongated shape. Accordingly, size does not necessarily correspond to a single diameter (although it could correspond to an average diameter or diameter in a singe, for example largest or smallest, dimension). In various embodiments, size can correspond to the mesh size or a screen size used in separation and/or sizing the solid biomass particles.

Agitating solid biomass particles can be facilitated by agitating solid biomass particles together with a material that is harder than the biomass. For example, the material can be a catalyst or other inorganic particulate material. The amount of size reduction, and thus the size of the resulting solid biomass particles can be modulated by the duration of agitation and the velocity of agitation. Other factors such as the relative hardness of the catalyst or another inorganic particulate material, the dryness (e.g., brittleness) of the solid biomass particles, and the method/vessel(s) in which agitation occurs also modulate the amount of size reduction. In embodiments using an abrading or grinding material that is a catalyst, the catalyst can become embedded in the biomass particles and/or the biomass particles can become embedded in the catalyst, which can facilitate catalytic conversion of the biomass.

A kneader can be used to knead the solid biomass particles and the catalyst, to make at least a portion of the solid biomass particles accessible to at least a portion of the catalyst. The kneader can be an extruder, miller, mixer, or grinder. The kneader can operate at greater than ambient temperature, for example, to facilitate removal or water and/or other solvent. For example, the kneader can be heated and/or heated gas (e.g., steam) can be provided to heat the biomass and catalyst.

In various embodiments, the kneader employs a solvent. The solvent can be water, an alcohol (e.g., ethanol or glycerol), a bio-oil or another product from the conversion of the biomass, a liquid acid, an aqueous solution of an acid or base, liquid $CO_2$, and the like. In one embodiment, the solvent is water (e.g., added water and/or water inherently present in the biomass), which can be selected for its availability, low cost, and/or ease of handling. In another embodiment, the solvent is a liquid produced during the subsequent conversion of the biomass, which can be selected for its availability. A solvent can be selected to improve penetration of a catalyst into biomass. A solvent can also improve penetration of a catalyst into biomass because a dry biomass can be more difficult to penetrate. A solvent can also be selected to remove ash precursors. Solvents can be removed (e.g., by drying) prior to subsequent processing and/or conversion. A kneader can remove at least a portion of a solvent absorbed in a biomass (e.g., by mechanical action and draining). Embodiments employing a kneader and a solvent can reduce the ash and/or mineral and/or metal content of the biomass.

In various embodiments, the biomass can be kneaded with one or more solid catalyst and/or inorganic particulate material. In some embodiments, the biomass can be kneaded with a dissolved and/or suspended catalyst. The dissolved and/or suspended catalyst can be used together with one or more solid catalyst and/or inorganic particulate material. Kneading can be continued and/or repeated to produce a biomass-catalyst mixture having the desired properties (e.g., particle size and/or degree of sensitization).

International Publication No. WO 2007/128800 A1 by O'Connor, the disclosure of which is incorporated herein by reference in its entirety, discloses catalysts and sensitizing biomass, as well as sensitizing by kneading.

Inorganic Material Pretreatment

In various embodiments, bio-oil yields of biomass thermo-conversion can be modified by pretreating (e.g., impregnating, co-milling, etc.) the biomass with certain inorganic materials. For example, low levels (about 4 wt %, about 2 wt %, about 1 wt %, or less) of acids, bases, and/or salts can be used to enhance bio-oil yields during biomass pyrolysis. Without wishing to be bound by theory, one hypothesis is that the inorganic material(s) can interact with the reactants (e.g., cellulose and hemicellulose) and/or reaction intermediates to move the reaction equilibrium from reactants toward products (e.g., bio-oil, syngas, char) and/or move the reaction equilibrium toward bio-oil products at the expense of char and/or syngas. In addition, the inorganic material(s) may also function as catalysts to increase the reaction rate of biomass thermo-conversion, thereby producing more products within the same amount of reaction time as compared to reactions conducted in the absence of the inorganic material(s), other reaction conditions being equal.

In various embodiments, impregnation can distribute the inorganic material relatively uniformly on the surface of the individual biomass particles and/or help the inorganic material penetrate thereinto. Impregnation can be performed by soaking biomass particles in an aqueous ionic solution containing the inorganic material. Mechanical mixing (e.g., stirring, agitating, kneading, co-milling, etc.) can also be used to distribute the inorganic material among biomass particles. Impregnation of the biomass particles with slurries containing well dispersed inorganic compounds in colloidal form is another method of placing the compounds in contact with the biomass before pyrolysis. For example, impregnation can be accomplished by applying a fine spray of a slurry to the biomass particles while vigorously agitating or fluidizing the mixture. In another example, impregnation can be accomplished in a kneader with spraying capability.

Biomass particles can also be pre-processed to include a heat carrier to facilitate thermo-conversion of biomass. For example, the heat carrier can facilitate heat transportation and distribution in the biomass feedstock. In certain embodiments, the heat carrier is an inorganic material that can be catalytic or inert. The heat carrier can be a regenerated material recycled from a previous thermo-conversion process.

In various embodiments, an inert inorganic material can be present in a crystalline or quasi-crystalline form. Exemplary inert materials include inorganic salts such as the salts of alkali and alkaline earth metals. Although these materials do not necessarily reactively participate in a subsequent chemical conversion of the polymeric material, the formation of discrete particles of these inert materials within the biomass can, in addition to transferring heat, mechanically break or open up the structure of the biomass, which can increase the biomass surface accessible to thermal contacts and reactions.

In one embodiment, the breaking or opening up is facilitated by crystalline or quasi-crystalline particles. For example, the inert material can be silica sand, a refractory transition metal oxide, a refractory clay, a calcined mixed metal oxide, or a combination of any two or more thereof.

To the extent desired, a catalyst may be introduced or incorporated into the thermo-conversion process at various points. A catalyst can be any material that speeds the conversion of organic components of the biomass into fuels, specialty chemicals, or precursors thereof. One skilled in the art would understand that in general, a catalyst participates in a chemical reaction and changes the reaction rate, typically without affecting reaction equilibrium. For example, a catalyst may lower the rate-limiting free energy of activation than the corresponding uncatalyzed reaction, resulting in higher reaction rate at the same temperature. As such, a catalyst does not typically affect product yield on its own.

In various embodiments, suitable catalysts include a solid particulate catalyst, a catalyst dissolved or suspended in a liquid, a water-insoluble catalyst, a fluid catalytic cracking catalyst, and/or a petroleum coke catalyst. The catalyst can be a particulate inorganic oxide (e.g., a refractory oxide, clay, hydrotalcite, hydrotalcite-like material, clay, layered hydroxy salt, mixed metal oxide, a calcination product of any of these materials; or a mixture thereof). Suitable refractory inorganic oxides include alumina, silica, silica-alumina, titania, zirconia, and the like. In one embodiment, the refractory inorganic oxides have a high specific surface (e.g., a specific surface area as determined by the Brunauer Emmett Teller ("BET") method of at least 50 $m^2/g$). Suitable clay materials include cationic and anionic clays, for example, smectite, bentonite, sepiolite, atapulgite, hydrotalcite, and the like. Suitable metal hydroxides and metal oxides include bauxite, gibbsite and their transition forms. Other suitable (and inexpensive) catalysts include lime, brine, and/or bauxite dissolved in a base (e.g., NaOH), or a natural clay dissolved in an acid or a base, or fine powder cement (e.g., from a kiln). Suitable hydrotalcites include hydrotalcite, mixed metal oxides and hydroxides having a hydrotalcite-like structure, and metal hydroxyl salts. Carbonates and hydroxides of alkali metals, and the oxides, hydroxides and carbonates of alkaline earth metals can also have catalytic properties. Catalytic inorganic particulate material can include mixtures of inorganic materials. Catalytic inorganic particulate material can include a spent (resid) fluid catalytic cracking catalyst containing (thermally treated) layered material. Employing spent catalyst can involve reusing waste material. The spent catalyst can be ground or pulverized into smaller particles to increase its dispersibility.

In some embodiments, a catalyst can be a catalytic metal. The catalytic metal can be used alone or together with another catalyst, refractory oxide, and/or binder. A catalytic metal can be used in a metallic, oxide, hydroxide, hydroxyl oxide, or salt form, or as a metallo-organic compound, or as a material including a rare earth metal (e.g., bastnasite). In certain embodiments, the catalytic metal is a transition metal. The catalytic metal can be a non-noble transition metal. For example, the catalytic metal can be iron, zinc, copper, nickel, and manganese. In one embodiment, the catalytic metal is iron. A catalytic metal can be contacted with the biomass by various methods. In one embodiment, the catalyst is added in its metallic form, in the form of small particles. Alternatively, the catalyst can be added in the form of an oxide, hydroxide, or a salt.

Contacting the inert and/or catalytic inorganic material, with the biomass, can be achieved by various methods. One method includes heating and fluidizing a mixture of the particulate biomass and the inert inorganic material, and adding the catalyst to the mixture as fine solid particles. Another method includes dispersing the catalytic material in a solvent (e.g., water), and adding the solvent to the mixture of particulate biomass material and the inert inorganic material. In an embodiment, a water-soluble salt of a metal catalyst is mixed with the biomass and the inert particulate inorganic material to form an aqueous slurry. The biomass and the aqueous solution of the metal salt can be mixed before adding the inert particulate inorganic material to facilitate the metal's impregnating the biomass. The biomass can also be mixed with the inert particulate inorganic material prior to adding the aqueous solution of the metal salt. In still another embodiment, an aqueous solution of a metal salt is mixed with the inert inorganic material, the material is dried prior to mixing it with the particulate biomass, and the inert inorganic material is thus converted to a heterogeneous catalyst.

Other Pretreatment Processes

According to the invention, pretreatment processes of biomass before biological, thermal, gasification, and/or pyrolysis processes can result in modifications of the biomass that allow these processes to be conducted at less severe conditions (i.e., lower temperatures, shorter contact times). Pretreatment can also make the processes more efficient for higher yield and better quality of liquid products (e.g., bio-oil) can be produced. In various embodiments, biomass feedstock can be chemically and/or physically pre-treated. In addition to the mechanical processing (e.g., milling, grinding, kneading, and/or agitating) discussed above, pretreatment conditions also include swelling, demineralization of chemicals, heat treatment, steam explosion, and impregnation of inorganic materials.

In general, lignocellulosic biomass, depending on its origin, contains, besides cellulose, hemicellulose and lignin, other components such as resins, tannins, terpenes, fats, etc. These materials, referred to as extractables, can be removed by organic solvents, including alcohols. Additionally, the lignocellulosic biomass, depending on its kind and origin, contain a variety of inorganic extractables such as metals. About 20 kinds of metals have been identified in various kinds of lignocellulosic biomass, which vary not only with the kind of biomass, but also with its origin. Mild treatments, like hot water (50-90° C.) can remove most of these extractables without altering the cellulosic components of the biomass.

One method of extractable removal includes contacting biomass with an aqueous solvent and allowing the biomass material to swell. In general, the removal of extractables results in increasing the rate of diffusion of the solvent and solutes into the biomass, hence is increasing the size of the capillaries, disrupting the cell wall structure, and decreasing the network of secondary hydrogen bonds. Thus, the internal structure of the cell wall loses stability, which increases the reactivity of the exposed surfaces towards the solvent/solute molecules. Therefore, removal of the extractables increases the rate, as well as the extent of swelling.

The solvent can be aqueous. The solvent can include an acid or base (e.g., inorganic acid or base). Although essentially any aqueous solvent can be used for demineralization, the aqueous phase of a liquid pyrolysis product can be particularly effective. The effectiveness is believed to be due to the presence of organic acids (e.g., carboxylic acid, acetic acid) in the aqueous phase. Without wishing to be bound by any theory, the acidity of the aqueous phase can facilitate the mobilization of minerals in the biomass. For example, the chelating effects of carboxylic acids can contribute to the solubilization and removal of mineral cations.

After swelling, at least part of the aqueous solvent can then be removed (e.g., dewatering) from the biomass by mechanical action (e.g., kneading, agitating, pressing). Ash precursors, such as dissolved extractables (e.g., minerals and/or metals), will thus be removed with the solvent. The mechanical action can occur in an agitator and/or a kneader. The mechanical action can be exerted by equipment such as a high shear mixer, kneader, colloid mill, planetary mixer, mixmiller, or ball mill.

Swelling and dewatering steps can be repeated to control the amount of minerals that are removed from the biomass. In addition to removing minerals from the biomass, the swelling and dewatering steps can make the biomass material more susceptible to a subsequent reaction. For example, swelling of the biomass can cause disruption of the internal bulk hydrogen bonding links between components and in general upset the compact nature of the bulk biomass particle.

In various embodiments, a pretreatment such as swelling and dewatering can reduce an ash content of biomass, or a hazardous disposal characteristic of an ash that can be subsequently produced. Removal of minerals (e.g., ash precursors) from the biomass can reduce the ash content. Removal of metals (e.g., ash precursors), particularly heavy metals, can also reduce ash content and prevent metal contamination of waste products, thereby facilitating disposal of waste by providing an uncontaminated waste product and reducing the cost of disposing of the waste product. Other pretreatments for reducing ash content can include washing or slurrying with an aqueous phase having pH above or below neutral, ion exchange (e.g., with ammonium solutions that would exchange a hydrogen ion with a metal ion), and steam stripping.

Various demineralization methods can be used to remove at least a fraction of a naturally occurring mineral (e.g., prior to a pyrolysis or catalytic cracking reaction). Demineralization can improve control over the reaction of the biomass. Many of the minerals naturally present in the biomass material can be catalytically active (e.g., potassium, iron). Although these materials can catalyze reactions, they can also increase coke yield, which is generally undesirable. Even when catalytic activity is desired, it can be preferable to first demineralize the biomass material so as to control the composition of their catalyst system. In certain embodiments, demineralization can reduce ash content to less than about 10 wt %, 9 wt %, 8 wt %, 7 wt %, 6 wt %, 5 wt %, 4 wt %, 3 wt %, 2 wt %, or 1 wt %, based on dry weight of the biomass material. The pretreatment can reduce metal (e.g., Fe) content to less than about 3,000, 2,500, 2,000, 1,500, 1,000, or 500 mg/kg, based on dry weight of the biomass.

Solvent explosion can include contacted the biomass with a pressurized solvent at a temperature above its natural boiling point (e.g., at atmospheric pressure). The pressurized solvent is in a liquid phase and swells the biomass. Then, the solvent is de-pressurized, causing rapid evaporation (i.e., boiling) of the solvent. This rapid evaporation can be referred to as solvent explosion. The solvent explosion can physically rupture the biomass material, thereby making it more accessible in a subsequent reaction.

Examples of solvents that can be used in solvent explosion include ammonia, carbon dioxide, water, and the like. If water is used as the solvent, the process can be referred to as steam explosion. It will be understood that the term steam explosion can be considered a misnomer, and that the term water explosion can be more accurate. Nevertheless, the term steam explosion will be used herein because it is an accepted term of art. The aqueous phase of the liquid pyrolysis product can be used in a steam explosion.

When steam explosion is combined with demineralization, the steam explosion can be carried out before or after the demineralization. For example, it can be advantageous to conduct the demineralization after the steam explosion because the steam explosion pretreatment can make the minerals more accessible, thereby making the demineralization more effective.

Pretreatments can also include a heat treatment by heating the biomass to a temperature of about 100-300° C. in an oxygen-poor or substantially oxygen-free atmosphere. The term oxygen-poor can refer to an atmosphere containing less oxygen than ambient air. The heat treatment can carried out in the presence of sufficient solvent (e.g., water) to swell the biomass material. The heat treatment can be carried out in a closed vessel to mitigate evaporation of the solvent. In some examples, the vapor (e.g., steam) formed under these conditions can displace oxygen present in the vessel and produce an oxygen-poor atmosphere. In one example, the aqueous phase of a liquid pyrolysis product can be the solvent in such a heat treatment.

Heat treatment can be carried out at a temperature low enough to mitigate carbon loss due to the formation of gaseous conversion products (e.g., CO, $CO_2$). A heat treatment can use, for example, a temperature of about 100-200° C. For example, a temperature can be about 100-140° C. A heat treatment can have a duration, for example, of about 2 min to 2 hours. For example, a duration can be about 20-60 min. In various examples, pressure can be released at the end of a heat treatment by opening the heat treatment vessel, which can allows the heat treatment to be combined with a steam explosion pretreatment step.

Even where the heat treatment essentially does not produce any gaseous conversion products, it can still result in a modification of the biomass. For example, the heat treatment can make the biomass more brittle and more hydrophobic. Both effects can be desirable from the perspective of a subsequent reaction. For example, increased brittleness can facilitate girding the biomass to a small particle size, to increase reactivity in a pyrolysis reaction, and increased hydrophobicity can facilitate drying the biomass.

A heat pretreatment step can be combined with one or more additions pretreatment steps (e.g., demineralization, steam explosion). Because of the increased hydrophobicity of heat treated biomass, it can be preferable to conduct any demineralization and/or steam explosion steps prior to the heat treatment; with the exception that steam explosion can be combined with heat treatment as described above. In one example, the biomass is swollen, dried (e.g., by heat), and then milled. It was observed that the swollen and dried biomass was more brittle than the raw biomass, which caused the milling to be more effective in producing smaller particles with a less severe milling.

Inorganic materials can be introduced to the biomass feedstock via various methods such as impregnation, co-milling, ion-exchange, etc. Impregnation can be used to enhance distribution of the inorganic material on the surface or penetration into the individual biomass particles. Impregnation can be performed by soaking biomass particles in an aqueous ionic solution containing the inorganic material. Mechanical mixing (e.g., stirring, agitating, kneading, etc.) and/or co-milling can also be used to distribute the inorganic material among individual biomass particles. Impregnation of the biomass particles with slurries containing well dispersed the inorganic compounds in colloidal form is another method of placing the compounds in intimate contact with the biomass before pyrolysis. For example, impregnation can be accomplished by applying a fine spray of a slurry to the biomass particles while vigorously agitating or fluidizing the mixture. Also, impregnation can be accomplished in a kneader with spraying capability.

Biomass Conversion

Biomass conversion technologies in general include: biological processes, such as anaerobic or aerobic fermentation; and thermal conversion processes, such as direct combustion for heating and generating electricity, gasification for producing syngas, pyrolysis for producing bio-oils which can be converted to fuels and chemicals, and hydrothermal processes where biomass is treated in slurry form in autoclaves at temperatures above 200° C. and under autogenous pressures.

In conjunction with the methods and compositions of the invention described here, pyrolysis processes can be suitable biomass conversion technique as having a high potential for large scale commercialization, due to the flexibility such processes provide for varying process conditions, such as heating rate, temperature, pressure, contact time, atmosphere, etc., to optimize yields of liquids (oil), gas and char. Pyrolysis is generally understood as the thermal degradation of biomass in the absence of oxygen to produce condensable vapours, gases, and charcoal; in some instances a small amount of air may be admitted to promote this endothermic process. The condensable (e.g., <25° C.) liquid product of pyrolysis are called pyrolysis liquid (also know as bio-crude-oil, bio-oil, pyroligneous acid, pyrolysis tar and biofuel-oil) which contains a wide range of oxygenated chemicals. The non-condensable product of pyrolysis are known as syngas or pyrolysis gas which contains CO, $CO_2$, $H_2$, $CH_4$, and higher hydrocarbons.

One skilled in the art would understand that various pyrolysis processes including slow, conventional, and fast pyrolysis, any of which can be catalyzed by one or more catalysts, can be used in connection with the present invention. For example, slow pyrolysis can be used to produce charcoal, tars, alcohols such as ethanol and methanol and other solvents. This is usually carried out in batch processes using kilns or retort furnaces. Slow pyrolysis can be characterized by:
    long solids and volatiles residence times (typically greater than 5 s for volatiles; solids residence times can be minutes, hours or days),
    relatively low reactor temperatures (e.g., <400° C.),
    atmospheric pressure,
    very low heating rates ranging from 0.01° C./s to up to 2° C./s,
    very low rate of thermal quenching of the products (minutes to hours).

In some embodiments, char, viscous tarry liquid and gases can be formed in approximately equal mass proportions due to the slow degradation of the biomass and extensive secondary intraparticle and gas/vapor phase reactions.

Conventional pyrolysis can be characterized by:
    long solids and volatiles residence times (typically less than 5 s for volatiles; solids residence times can be longer) up to one minute,
    relatively low reactor temperatures (e.g., <450° C.),
    slow heating rates of, e.g., about 2-10° C./s,
    atmospheric pressure,
    low rate of thermal quenching of the products.

Yields of organic liquids products from conventional pyrolysis, in one embodiment, can be around 20%, with char yields of about 20-25 wt %, about 20 wt % water, and the balance non-condensable gases comprised mainly of carbon dioxide. Yields are subject the composition of the starting material. In various embodiments, organic liquids yields can be increased by including an inorganic material in accordance with the present invention.

Some features of fast pyrolysis include:
high heating rates (e.g., >1000° C./s),
reactor temperatures greater than 400° C.,
short vapor product residence times (e.g., <2 s for liquid fuels, <1 s for specialty chemicals),
rapid thermal quenching of the products (e.g., 100-1000° C./s).

The fast pyrolysis process can be operated from about 400-600° C. to optimize liquid yields (depending on the feedstock) and in some cases above 600° C. to increase or optimize the gas yield (syngas). Fast pyrolysis may also be referred to as high temperature pyrolysis.

Of particular interest is fast (or flash) pyrolysis designed to convert the biomass to maximum amounts of oil, employing a very low residence time. Fast pyrolysis can be performed at a very high heating rate where organic materials are rapidly heated to high temperatures (e.g., 400° C.-600° C.) in the absence of oxygen. In one example, fast pyrolysis can take place in less than two seconds with temperatures between 300 and 550° C. A pyrolysis vapor produced therefrom can be cooled down to room temperature to obtain pyrolysis liquid product (e.g., bio-oil). The non-condensable gases and the solid residue bio-char are valuable by-products which can be used as a heating source. The bio-oil produced has a high energy density that can be directly used in combustion or refined to fuels and specialty chemicals.

As discussed above, biomass may comprise a mixture of hemicellulose, cellulose, lignin and minor amounts of other organics which each pyrolyze or degrade at different rates and by different mechanisms and pathways. Lignin can decompose over a wider temperature range compared to cellulose and hemicellulose which rapidly degrade over narrower temperature ranges, hence the thermal stability of lignin during pyrolysis. The rate and extent of decomposition of each of these components depends on the process parameters of reactor (pyrolysis) temperature, biomass heating rate and pressure. The degree of secondary reaction (and hence the product yields) of the gas/vapor products depends on the time-temperature history to which they are subjected before collection, which includes the influence of the reactor configuration.

Liquid production can be performed at very low vapor residence time to minimize secondary reactions (e.g., below 2 seconds or 1 second). Acceptable yields can also be obtained at residence times of up to 5 seconds if the vapor temperature is kept below 400° C. Both residence time and temperature control can be optimized to "freeze" the intermediates of most chemical interest in conjunction with moderate gas/vapor phase temperatures of 400-500° C. before recovery of the product to maximize organic liquid yields. In certain embodiments, very short vapor residence times of between 30 and 1500 ms and reactor temperatures around 500° C. can be utilized.

The time and temperature profile between formation of pyrolysis vapors and their quenching influences the composition and quality of the liquid product. High temperatures can continue to crack the vapors and generally speaking, the longer the vapors are at higher temperatures, the greater the extent of cracking. Although secondary reactions become slow below around 350° C., some secondary reactions can continue down to room temperature which contributes to the instability of the bio-oil. The time-temperature envelope that the pyrolysis vapors endure can affect the oil quality. Char can also contribute to vapor cracking as described above. In general, short residence times may result in incomplete depolymerization of the lignin due to random bond cleavage and inter-reaction of the lignin macromolecule resulting in a less homogenous liquid product, while longer residence times can cause secondary cracking of the primary products, reducing yield and adversely affecting bio-oil properties. Thus, vapor residence times of a few hundred milliseconds can be used for optimum yields of chemicals and food additives, while fuels can tolerate longer vapor residence times (e.g., up to around 5 s) over a wider temperature range.

The process conditions of fast pyrolysis can be selected in order to maximize liquid yields. For example, in Ablative Fast Pyrolysis, pressure can be applied to biomass to increase speed of decomposition through use of centrifugal or mechanical force. Larger particles of biomass can be used in this process. In Cyclonic Fast Pyrolysis (also called vortex fast pyrolysis), solids are separated from the non-condensable gases and returned to the mixer. In Rotating Cone Fast Pyrolysis, a compact high intensity reactor is used where biomass of ambient temperature is mixed with hot sand. Fluid bed and circulating fluid bed pyrolysis transfers heat from a heat source to the biomass by a mixture of convection and conduction. The heat transfer limitation is generally within the particle, and thus, may require small particles (e.g., not more than 3 mm) to obtain good liquid yields. Substantial carrier gas may be needed for fluidization or transport. Vacuum pyrolysis has slow heating rates but removes pyrolysis products rapidly using a vacuum and thus simulates fast pyrolysis.

Acceptable yields can be obtained at temperatures in the range 450-550° C. and residence times of 0.5-5 s depending on the particular process. In various embodiments, a particulate heat carrier can be mixed with biomass, e.g., in a fluidized bed reactor to produce bio-oil. The heat carrier can be an inert material (e.g., silica sand) and/or a catalytic material (e.g., zeolite). The heat carrier can be spent or regenerated. Heat carriers (sand or others) can supply the heat necessary to the pyrolysis process. In one example, the use of sand as a heat carrier offers the advantage of a compact construction because of the high heat transfer rate from the sand to biomass particles.

The pyrolysis-derived bio-oils can be directly applied for use in combustion (e.g., as a boiler fuel to provide heat), engines, gas turbines, etc. The bio-oil can also by upgraded for additional uses such as transport fuels, synthetic fossil fuels, chemicals, etc. Upgrading can decrease oxygen contents, reduce viscosity, reduce corrosiveness and/or increase stability.

Examples

In various embodiments, an inorganic material present in an effective amount is used to increase pyrolysis yield of an organic liquid product (e.g., bio-oil). The inorganic material can be introduced into, placed in contact with, and/or processed together with a biomass such that at least a portion of the inorganic material is accessible to at least a portion of the biomass. The inorganic material is selected from the group consisting of aluminum sulfate, aluminum nitrate, aluminum chloride, aluminum hydroxide, ammonium hydroxide, magnesium hydroxide, potassium hydroxide, calcium hydroxide, sodium hydroxide, or any combination thereof. In certain embodiments, the inorganic material is aluminum sulfate. The inorganic material can be impregnated, co-milled, or otherwise mixed with the biomass. In some examples, the inorganic material is present between about 0.1 wt % to about 4 wt %, between about 0.1 wt % to about 3 wt %, between about 0.1 wt % to about 4 wt %, about 0.5 wt % to about 2 wt %, or at about 1 wt %.

The present invention can be used, in an example, in connection with a biomass fast pyrolysis process development unit which implements the transported fluid bed reactor technology, e.g., the biomass pyrolyzer designed and operated under the European Energy project BIOCAT (ENK6-CT2001-00510) at the Chemical Process Engineering Research Institute (CPERI) in Greece. The BIOCAT unit is described in Lappas et al., *Ind. Eng. Chem. Res.* 2008, 47, 742-747, the disclosure of which is hereby incorporated by reference in its entirety. Briefly, the system can include a biomass feed section having a feed hopper and a screw feeder, a solids feed system having a heat reactor vessel or regenerator (to regenerate the spent solids and to supply the solids with the required heat for the biomass pyrolysis reactions), a reactor having an injector (for mixing of the hot solids with the biomass particles and initiating pyrolysis reactions) and a riser (for continued pyrolysis reactions), a stripper and solids recovery section (for stripping off vapors trapped within solids and recovering solids), and a liquid product recovery section having a heat exchanger (for cooling the vapors), a liquid product stabilizer (for separating the liquid and gaseous products) and a charcoal trap (for removing light oil and heavier gas components from the gaseous stream). The residual pyrolysis oil on the walls of the condensers can be recovered by rinsing the condensers with an organic solvent (e.g., acetone). The acetone can be evaporated subsequently to recover the oil. In addition, spent solids (inert or catalytic materials) that have been used in a previous run can be regenerated in the regenerator and be supplied to a new biomass feedstock for next pyrolysis reactions.

Products can be collected and analyzed by various methods. The gaseous pyrolysis products can be measured, for example, using an HP 6890 GC, equipped with four columns (precolumn OV-101; columns Porapak N, Molecular Sieve 5A, and Rt-Qplot) and two detectors (TCD and FID). The solid product (char and coke) can be analyzed, for example, using an elemental (C and H) analyzer. For the physical characterization of bio-oil standard analytical techniques can be applied, based on methods used for conventional fuels analysis. The chemical characterization of the bio-oil can be performed, for example, based on GC and GC/mass spectrometry (MS) analytical techniques employed to the ether-soluble fraction of the bio-oil. In some examples, for the GC analysis an HP 5890 GC, equipped with an HP-5 column and a FID detector, can be used while for the GC/MS analysis an HP 5989 MS ENGINE (electron energy 70 eV; emission 300 V; helium flow rate 0.7 $cm^3$/min; column HP-5MS) can be used.

In one example, the present invention demonstrates that bio-oil yields can be modified in the presence of specific inorganic materials. Low levels of inorganic materials were impregnated into biomass particles by soaking milled pine wood chips (e.g., average particle size from about 250 to 850 micron) in a solution containing aluminum sulfate or ammonium hydroxide such that the treated milled pine wood contained 1 wt % aluminum sulfate or 1 wt % ammonium hydroxide, respectively. In one embodiment, dried pine wood chips (e.g., moisture content less than 10 wt %) was hammer milled and screened to collect the desired particle size fraction (e.g., 250 to 850 micron average particle size). Subsequent treatment involved impregnating milled pine wood with a solution of either aluminum sulfate or ammonium hydroxide (1 wt % based on the weight of the milled pine wood) and heating to about 190° F. with stirring for one hour in a closed Planetary mixer to prevent evaporation. This treatment was used to swell the wood fibers and allow deep penetration of the solution into the wood. The volume of the solution used was sufficient to substantially or completely fill the available pore volume of the resulting swollen wood. The volume of the solution can also be slightly excessive. After the swelling treatment was completed, the Planetary mixer was vented to allow evaporation of water. Drying was continued until the treated pine wood was dried to a moisture content of less than about 10 wt %.

Pyrolysis experiments were then conducted on the untreated (control) and treated milled pine wood at 842° F. (450° C.) and 932° F. (500° C.), respectively. A silica sand with particle size in the range 100-250 μm and bulk density 1.56 g/mL was used as a solid heat carrier. Products were collected and analyzed at various points: the liquid product stabilizer, the charcoal trap, and the acetone washed products. Results were summarized in Tables 1-3, showing pyrolysis yields in control experiments (untreated pine), 1 wt % aluminum sulfate containing pine, and 1 wt % ammonium hydroxide containing pine.

Specifically, as shown in Table 1, for untreated pine, at 842° F. the total bio-oil (organic phase) yield on wet basis was measured at 47.00 wt %; at 932° F. the total bio-oil (organic phase) yield on wet basis was measured at 47.87 wt %. Table 2 shows that upon aluminum sulfate pretreatment, at 842° F. the total bio-oil (organic phase) yield on wet basis was measured at 62.19 wt %; at 932° F. the total bio-oil (organic phase) yield on wet basis was measured, in two independent experiments, at 63.93 wt % and 65.37 wt %, respectively. Table 3 shows that upon ammonium hydroxide pretreatment, at 842° F. the total bio-oil (organic phase) yield on wet basis was measured at 51.24 wt %; at 932° F. the total bio-oil (organic phase) yield on wet basis was measured at 53.34 wt %. These results demonstrate that pretreating the biomass with various compounds can have a significant impact upon the total bio-oil yields. In particular, 1 wt % aluminum sulfate pretreatment increased total bio-oil yields for at least about 15% at both temperatures tested, and 1 wt % ammonium hydroxide pretreatment increased total bio-oil yields for about 5% at both temperatures.

One skilled in the art would understand that there are many variables in experimental conditions such as the experiment time and temperature, amount of inorganic materials, amount of inert materials, amount of catalysts, moisture of the biomass, type of the biomass, and total biomass used, etc. These and other variables may result in small experimental variations in product yields. Notwithstanding, one skilled in the art would appreciate that the increases observed (e.g., aluminum sulfate: 62.19% versus 47.00% at 842° F., 63.93% and 65.37% versus 47.87% at 932° F.; ammonium hydroxide: 51.24% versus 47.00% at 842° F., 53.34% versus 47.87% at 932° F.) represents statistically significant changes, in particular in view of the systematic increases for either compound at different temperatures.

In various embodiments, a mixture of inorganic material(s) can be used to impregnate the biomass so as to increase bio-oil yields. Impregnation with inorganic material(s) can also be combined with other pretreatment methods (e.g., co-milling, swelling, demineralization, steam explosion, heat treatment, etc.) to further increase bio-oil yields as described herein. Pretreated biomass can be more reactive towards thermo-conversions. For example, swollen biomass can have larger bulk porosity, thereby allowing gases and condensable vapors (oils) to escape the solid particles faster and with a smaller amount of bulk entrapment. In addition, inorganic materials can be introduced to swollen and/or steam exploded biomass particles. Alternatively, impregnation can be followed by steam explosion to further distribute the inorganic materials both on a surface of the biomass particles and within the porous structure of the particles. Thus, higher yields of oils and gases can be produced in pyrolysis and other biomass conversion systems, with minimum amounts of residues (chars).

In these and other examples, a liquid product, or a fraction thereof, can be used or sold as a final product and/or can be subject to further processing/upgrading to producing a fuel or specialty chemical. In various embodiments, reaction intermediates can be stripped quickly from the inert materials/catalysts and unconverted biomass to limit secondary (e.g., undesired) reactions. Alternatively, secondary reactions can proceed where oxygen can be stripped (e.g., as CO, $CO_2$, $H_2O$) from hydrocarbon intermediates to produce traditional fuel or specialty chemical products. Examples of fuels include light gases (ethane, propane, butane), naphtha, and distillates (jet fuel, diesel, heating oil). Examples of chemicals include light olefins (ethylene, propylene, butylenes), acids (like formic and acetic), aldehydes, alcohols (ethanol, propanol, butanol, phenols), ketones, furans, and the like. In general, a liquid product, or a fraction thereof, is chemically similar or essentially indistinguishable (e.g., in terms of commercial use and/or commercial value) from a convention petrochemical product or intermediate.

In addition, as described herein, biomass feedstock, inert material, catalyst, pretreatment, treatment, reaction vessel(s), and reaction conditions can each be selected based upon the type of biomass and the desired product(s). The methods can be part of a broader method (e.g., a broader method can include any one or more steps of harvesting biomass, pre-processing biomass, further processing, refining, upgrading, separating, transporting products, intermediates, and the like).

In some examples, a biomass feedstock can include a plurality of solid biomass particles. A plurality of solid biomass particles can be characterized by an average size between about 50 and about 750 microns and individual sizes between about 0.1 and about 1000 microns. The plurality of solid biomass particles can be substantially characterized by at least about 80% of the particles having individual sizes of about 10 (or 15 or 20) microns or less. The method can include agitating solid biomass particles, to reduce a size characterizing at least a portion of the particles. The method can also include separating (e.g., with a high velocity cyclone) a biomass-catalyst mixture including the particles and a catalyst into a fine fraction having particles of about a predetermined size and a coarse fraction having particles of greater than about the predetermined size.

Solid biomass particles can be pretreated or pre-processed (e.g., chemically and/or physically). For example, the solid biomass particles can be dried and/or subjected to particle size reduction. Pre-processing can increase brittleness, susceptibility to catalytic conversion (e.g., by roasting, toasting, and/or torrefaction, for example, at a temperature below about 300, 375, 350, 325, 300, 275, 250, 225, 200, 175, 150, 125, or 100° C.) and/or susceptibility to mixing with a petrochemical feedstock (e.g., by increasing hydrophobicity). Pre-processing can include de-mineralizing the biomass feedstock (e.g., removing ash precursors from the solid biomass particles, removing a mineral component capable of inactivating a catalyst).

In various embodiments, the biomass feedstock can further include a heat carrier. The heat carrier can include without limitation, an inert material, a catalytic material, a regenerated catalytic material, or a combination of any two or more thereof. In some embodiments, the inert material can include without limitation, silica sand, a refractory transition metal oxide, a refractory clay, a calcined mixed metal oxide, or a combination of any two or more thereof.

The biomass feedstock can include a catalyst (e.g., a basic catalyst, an acid catalyst, a zeolite catalyst, etc.). Basic inorganic materials which can enhance the decomposition of the raw biomass thereby acting as include the alkaline and alkaline earth salts, oxides, hydroxides, carbonates, hydroxylcarbonates, etc. Acidic inorganic materials that interact with the evolving organic gases and liquid products produced in-situ from the thermolysis of biomass can also be used as catalysts. Examples of acidic catalysts include solid super-acids, fluorinated transition metal oxides (i.e., F-doped aluminum oxides), acidic zeolites, acidic clays, alumina-titania, silica-alumina composites with or without zeolites, and so on. In certain examples, the catalyst can be one or more of a hydrotreating, hydrocracking, NiMo, CoMo, NiCoMo, and noble metal catalyst. The catalyst can be in interaction with at least a portion of the plurality of solid biomass particles. For example, the biomass feedstock can be a plurality of ligno-celullosic biomass particles in interaction with a catalyst. In some cases, the biomass feedstock can be substantially free of a mineral component (e.g., contamination) capable of inactivating a catalyst.

In some examples, pretreatments such as de-mineralizing the biomass feedstock or selecting a biomass feedstock having a relatively low mineral content (e.g., essentially cellulose) can mitigate the need to replace or regenerate the catalyst. Where the reactor is operated in a switching fashion, it can be important to limit the mineral content of the biomass feedstock to ensure sufficient catalytic activity throughout a reaction cycle. A guard reaction can also be employed to mitigate inactivation of catalyst by minerals in the biomass feedstock. Catalyst (e.g., in a guard reactor) can be selected to have a greater than average macroporous region pore volume, so that it can tolerate a greater quantity of contaminants before becoming inactivated. To some degree, sufficient catalytic activity can be ensured by selecting more active catalyst and/or providing more catalyst.

The pyrolysis unit can be part of a larger apparatus or system. For example, a larger apparatus can include one or more systems for harvesting, pretreating, further processing, refining, upgrading, separation, transportation, and the like. The invention can be carried out at a site adjacent to a biomass growth source. For example, the site can be near a source of a biomass feedstock, which can reduce transportation costs for a biomass feedstock and a liquid product. Operation at a site adjacent to a biomass growth source can also include other advantages such a recycling water and ash byproducts to the biomass growth source.

A liquid product can be produced by pyrolysis of a biomass feedstock in a pyrolysis unit having a fluidized reactor. Pyrolysis can be followed by or combined with catalytic cracking to upgrade the liquid product (pyrolysis oil). In these and other examples, a pyrolysis unit can include a reactor (e.g., fluidized reactor) that can support fast pyrolysis and/or catalytic cracking of the biomass feedstock. The fast pyrolysis can convert the biomass into syngas (including CO and hydrogen), bio-oil, and char. The catalytic cracking can further convert the biomass into hydrocarbon compounds (including carbon from the biomass) and water (including oxygen from the biomass). Hydrocarbon compounds can include oxygenated hydrocarbons like aldehydes, alcohols, ketones, and acids (e.g., for use a specialty chemicals) as well as straight chain or branched alkynes, alkenes, and alkynes. CO and $CO_2$ (including both carbon and oxygen from the biomass) can also be produced. Liquid (e.g., hydrocarbon) product yield can be increased, controlled, optimized, and/or maximized by increasing $H_2O$ formation relative to at least one of CO and $CO_2$ formation. Catalytic cracking can be performed by adding zeolitic and other inorganic catalysts to the pyrolysis reactor. In one example, a hydrogenated pyrolysis oil with reduced total acid number (TAN) and oxygenate levels and greater stability can be produced.

The fast pyrolysis methods can employ a reaction time that favors kinetic products relative to equilibrium products. A reaction time can be about 2 seconds or less (e.g., about 2. 1.75, 1.5, 1.25, 1, 0.9, 0.8, 0.7, 0.6, 0.5, 0.4, 0.3, 0.2, 0.1 seconds). A reaction temperature can be in a range of about 200-1000° C. For example, the reaction temperature can be about 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, or 1000° C. The reaction temperature can be in a range of about 200-1,000, 300-900, 300-850, 400-800, 400-750, 450-700, 450-650, 450-600, 500-600, and 500-550° C.

A pyrolysis unit can be a conventional petrochemical refinery unit, for example, a fluid catalytic cracking (FCC) unit. The FCC unit can be modified or adapted (e.g., retrofitted equipment and/or altered operating parameters) for co-processing a biomass feedstock and a petrochemical feedstock. Alternatively, a pyrolysis unit can be designed and purpose-built (e.g., employing petrochemical refinery unit hardware and operating parameters).

The pyrolysis unit can include a fluid bed reactor. A fluid bed reactor can support high throughput processing (e.g., a traditional hydrotreater reactor can require about 1 hour to accomplish what a fluid bed reactor can accomplish in about 1 second, due to differences in batch versus continuous operation and other operating conditions). A pyrolysis unit can include a bed (e.g., fixed bed and/or ebulating bed) reactor. A pyrolysis unit can include a transport and/or riser reactor. Catalytic cracking reactors can include a system for refreshing, replacing, regenerating, and/or circulating catalyst.

The pyrolysis unit can include a system for feeding a feedstock to a reactor. For example, the system can feed a biomass feedstock (e.g., particles, fluidized particles, oil or other liquid) to the reactor. The system can feed two or more feedstocks to the reactor, such that the feedstocks mix in the reactor. Alternatively, the system can feed a pre-mixed feedstock to the reactor. In various embodiments, the system can control one or more operating parameters (e.g., heating of the individual and mixed feedstocks, flow volume, flow rate, flow timing, total amounts of feedstocks, and the like).

A pyrolysis unit can also include any one or more additional reaction vessels, knock out drums, strippers, towers, catalyst regenerators, catalyst coolers, and the like. A pyrolysis unit can include a system for pre-processing the biomass feedstock. A pyrolysis unit can include a system for providing biomass feedstock and petrochemical feedstock to a reaction vessel. A pyrolysis unit can also include a system for transporting and/or storing a product (e.g., the liquid product or a fraction thereof).

A reactor can operate in either a continuous or switching (e.g., swing reactor) fashion. For example, each train of the pyrolysis unit can be preceded by a pair of switchable guard reactors, so that catalyst in the reactor not in operation can be replaced to remove contaminants without allowing a disruptive pressure drop to occur. A guard reactor can include a system for removing and replacing spent catalyst with fresh catalyst (e.g., an ebulating bed reactor with a system to remove spent catalyst and a system to add fresh catalyst). Where the reactor is operated in a continuous fashion, the catalyst can be continuously replaced or regenerated. A guard reactor can help extend catalyst life in the main reactor, by limiting catalyst deactivation due to contaminants substantially to the guard reactor.

It should be appreciated that while the use of inorganic materials to increase bio-oil yield has been described in connection with pyrolysis, the invention can also be applied to other biomass thermo-conversion processes (e.g., gasification, combustion, liquefaction, and hydrothermal processes) and biochemical (e.g., anaerobic or aerobic fermentation) or catalytic processes.

While the invention has been particularly shown and described with reference to specific embodiments, it should be understood by those skilled in the art that various changes in form and detail can be made without departing from the spirit and scope of the invention as defined by the appended claims.

TABLE 1

Pyrolysis yields in control experiments

| Experimental conditions | Control | |
|---|---|---|
| | Untreated Pine | Untreated Pine |
| Feed | | |
| Catalyst | Silica Sand | Silica Sand |
| Pyrolysis Temperature, ° F./° C. | 842° F./450° C. | 932° F./500° C. |
| Reactor Temperature, ° F./° C. | 842° F./450° C. | 932° F./500° C. |
| Riser Temperature, ° F./° C. | 842° F./450° C. | 932° F./500° C. |
| Stripper Temperature, ° F./° C. | 830° F./443° C. | 932° F./500° C. |
| Catalyst to Biomass Ratio | 16.08 | 16.08 |
| Experiment Time (min) | 144.00 | 137.00 |
| Moisture of biomass (% wt) | 6.00 | 6.00 |
| Total Biomass (gr) | 1000.00 | 774.00 |
| Gas Yield (% wt) (Wet Basis) | | |
| CO2 | 6.66 | 5.84 |
| CO | 5.36 | 7.00 |
| CO + CO2 | 12.02 | 12.84 |
| CO2/H2O | 0.29 | 0.24 |
| (CO + CO2)/H20 | 0.52 | 0.53 |
| | Yield (wt %) | Yield (wt %) |
| Liquid recovery | | |
| Primary Liquid | 54.87 | 56.77 |
| Charcoal Trap | 5.15 | 4.86 |
| Acetone washings | 10.24 | 10.28 |
| ON WET BASIS | | |
| Total water | 23.26 | 24.05 |
| Total bio-oil (organic phase) | 47.00 | 47.87 |
| Total Cracked Gases | 12.56 | 13.93 |
| Spent Catalyst Coke | 11.72 | 9.31 |
| Light Hydrocarbon | 0.54 | 1.09 |
| TAN of Stabilizer | 59.83 | 53.90 |
| TAN of Acetone Washings | 73.61 | — |
| H2O in Stabilizer | 38.67 | 38 |
| H2O in Charcoal Trap (estimation) | 20 | 20 |
| H2O in Acetone Washings | 9.84 | 14.6 |
| O Recovery wt % | 102.87 | 103.10 |
| O in Prim. Liq. wt % | 34.48 | 35.44 |
| O in Acet. Wash. wt % | 34.44 | 32.76 |
| O in Prim. And Acet. Overall wt % | 34.47 | 34.55 |

TABLE 2

Pyrolysis yields after pretreatment with aluminum sulfate

| Experimental conditions | Aluminum Sulfate Pretreatment | | |
|---|---|---|---|
| | Pine (1 wt % Aluminum Sulfate) | Pine (1 wt % Aluminum Sulfate) | Pine (1 wt % Aluminum Sulfate) |
| Feed | | | |
| Catalyst | Silica Sand | Silica Sand | Silica Sand |
| Pyrolysis Temperature, °F./°C. | 842° F./450° C. | 932° F./500° C. | 932° F./500° C. |
| Reactor Temperature, °F./°C. | 842° F./450° C. | 932° F./500° C. | 932° F./500° C. |
| Riser Temperature, °F./°C. | 842° F./450° C. | 932° F./500° C. | 932° F./500° C. |
| Stripper Temperature, °F./°C. | 830° F./443° C. | 932° F./500° C. | 932° F./500° C. |
| Catalyst to Biomass Ratio | 16.08 | 16.08 | 16.08 |
| Experiment Time (min) | 121.00 | 89.00 | 138.00 |
| Moisture of biomass (% wt) | 4.70 | 4.70 | 4.70 |
| Total Biomass (gr) | 634.00 | 430.00 | 765.00 |
| Gas Yield (% wt) (Wet Basis) | | | |
| $CO_2$ | 3.22 | 4.88 | 3.55 |
| CO | 2.74 | 6.47 | 5.67 |
| $CO + CO_2$ | 5.97 | 11.35 | 9.22 |
| $CO_2/H_2O$ | 0.26 | 0.32 | 0.33 |
| $(CO + CO_2)/H_2O$ | 0.47 | 0.74 | 0.85 |
| | Yield (wt %) | Yield (wt %) | Yield (wt %) |
| Liquid recovery | | | |
| Primary Liquid | 57.31 | 52.25 | 57.08 |
| Charcoal Trap | 3.20 | 9.01 | 4.34 |
| Acetone washings | 14.30 | 17.11 | 14.83 |
| ON WET BASIS | | | |
| Total water | 12.62 | 14.43 | 10.88 |
| Total bio-oil (organic phase) | 62.19 | 63.93 | 65.37 |
| Total Cracked Gases | 6.33 | 12.36 | 10.14 |
| Spent Catalyst Coke | 13.22 | 10.48 | 11.02 |
| Light Hydrocarbon | 0.37 | 1.02 | 0.92 |
| TAN of Stabilizer | 41.17 | 45.79 | 44.00 |
| TAN of Acetone Washings | 31.41 | 41.51 | 40.53 |
| $H_2O$ in Stabilizer | 18.47 | 20.41 | 14.48 |
| $H_2O$ in Charcoal Trap (estimation) | 20 | 20 | 20 |
| $H_2O$ in Acetone Washings | 9.73 | 11.49 | 11.77 |
| O Recovery wt % | 94.81 | 110.32 | 101.63 |
| O in Prim. Liq. wt % | 42.37 | 43.86 | 44.75 |
| O in Acet. Wash. wt % | 38.71 | 41.79 | 39.01 |
| O in Prim. And Acet. Overall wt % | 41.58 | 43.23 | 43.54 |

TABLE 3

Pyrolysis yields after pretreatment with ammonium hydroxide

| Experimental conditions | Ammonium Hydroxide Pretreatment | |
|---|---|---|
| | Pine (1 wt % Ammonium Hydroxide) | Pine (1 wt % Ammonium Hydroxide) |
| Feed | | |
| Catalyst | Silica Sand | Silica Sand |
| Pyrolysis Temperature, °F./°C. | 842° F./450° C. | 932° F./500° C. |
| Reactor Temperature, °F./°C. | 842° F./450° C. | 932° F./500° C. |
| Riser Temperature, °F./°C. | 842° F./450° C. | 932° F./500° C. |
| Stripper Temperature, °F./°C. | 830° F./443° C. | 932° F./500° C. |
| Catalyst to Biomass Ratio | 16.08 | 16.08 |
| Experiment Time (min) | 157.00 | 193.00 |
| Moisture of biomass (% wt) | 5.10 | 5.10 |
| Total Biomass (gr) | 771.00 | 955.00 |
| Gas Yield (% wt) (Wet Basis) | | |
| $CO_2$ | 6.67 | 6.31 |
| CO | 5.66 | 7.42 |
| $CO + CO_2$ | 12.32 | 13.73 |
| $CO_2/H_2O$ | 0.45 | 0.40 |
| $(CO + CO_2)/H_2O$ | 0.83 | 0.88 |
| | Yield (wt %) | Yield (wt %) |
| Liquid recovery | | |
| Primary Liquid | 43.13 | 50.61 |
| Charcoal Trap | 7.33 | 4.01 |
| Acetone washings | 15.69 | 14.35 |
| ON WET BASIS | | |
| Total water | 14.90 | 15.63 |
| Total bio-oil (organic phase) | 51.24 | 53.34 |
| Total Cracked Gases | 13.02 | 15.01 |
| Spent Catalyst Coke | 12.90 | 10.37 |
| Light Hydrocarbon | 0.69 | 1.28 |
| TAN of Stabilizer | 45.30 | 46.65 |
| TAN of Acetone Washings | 54.81 | 50.12 |
| $H_2O$ in Stabilizer | 29.90 | 27.23 |

TABLE 3-continued

Pyrolysis yields after pretreatment with ammonium hydroxide

| Experimental conditions | Ammonium Hydroxide Pretreatment | |
|---|---|---|
| H2O in Charcoal Trap (estimation) | 20 | 20 |
| H2O in Acetone Washings | 3.46 | 7.3 |
| O Recovery wt % | 95.01 | 101.04 |
| O in Prim. Liq. wt % | 37.98 | 39.10 |
| O in Acet. Wash. wt % | 30.74 | 30.74 |
| O in Prim. And Acet. Overall wt % | 35.56 | 36.88 |

What is claimed is:

1. A method for pretreating a solid biomass for pyrolysis, comprising contacting the solid biomass with an inorganic material present in an effective amount for increasing pyrolysis yield of an organic liquid product, wherein the inorganic material is selected from the group consisting of aluminum sulfate, ammonium hydroxide, and any combination of the foregoing, thereby forming a pre-treated biomass comprising the inorganic material in the effective amount.

2. The method of claim 1, wherein the inorganic material is present between about 0.1 wt % to about 4 wt % in the pre-treated biomass.

3. The method of claim 1 further comprising contacting the pre-treated biomass with a heat carrier.

4. The method of claim 3, wherein the heat carrier comprises an inert material, a catalytic material, a regenerated catalytic material, or a combination of any two or more thereof.

5. The method of claim 4, wherein the inert material comprises silica sand, a refractory transition metal oxide, a refractory clay, a calcined mixed metal oxide, or a combination of any two or more thereof.

6. A method for producing an organic liquid product from a solid biomass, the method comprising:
   (i) contacting the solid biomass with an inorganic material present in an effective amount for increasing pyrolysis yield of an organic liquid product to form a pre-treated biomass comprising the inorganic material in the effective amount, wherein the inorganic material is selected from the group consisting of aluminum sulfate, ammonium hydroxide, and any combination of the foregoing; and
   (ii) subjecting the solid pre-treated biomass to a pyrolysis reaction in the presence of the inorganic material, to produce the organic liquid product.

7. The method of claim 6, wherein the inorganic material is aluminum sulfate.

8. The method of claim 6, wherein the inorganic material is present between about 0.1 wt % to about 4 wt % in the pre-treated biomass.

9. The method of claim 6 wherein contacting the solid biomass in step (i) further comprises contacting the solid biomass with a heat carrier.

10. The method of claim 9, wherein the heat carrier comprises an inert material, a catalytic material, a regenerated catalytic material, or a combination of any two or more thereof.

11. The method of claim 10, wherein the inert material comprises silica sand, a refractory transition metal oxide, a refractory clay, a calcined mixed metal oxide, or a combination of any two or more thereof.

12. The method of claim 6, wherein the pyrolysis reaction is conducted at between about 400° C. and about 600° C.

13. A composition for pyrolysis comprising a solid biomass and an inorganic material, wherein the inorganic material is present at between about 0.1 wt % and about 4 wt %, and wherein at least a portion of the inorganic material is accessible to at least a portion of the solid biomass, wherein the inorganic material is selected from the group consisting of aluminum sulfate, ammonium hydroxide, and any combination of the foregoing.

14. The composition of claim 13, wherein the inorganic material is aluminum sulfate.

15. The composition of claim 13, wherein the inorganic material is ammonium hydroxide.

16. The composition of claim 13 further comprising a heat carrier.

17. The composition of claim 16, wherein the heat carrier comprises an inert material, a catalytic material, a regenerated catalytic material, or a combination of any two or more thereof.

18. The composition of claim 17, wherein the inert material comprises silica sand, a refractory transition metal oxide, a refractory clay, a calcined mixed metal oxide, or a combination of any two or more thereof.

* * * * *